(12) United States Patent
Zhang (10) Patent No.: US 9,377,671 B2
(45) Date of Patent: Jun. 28, 2016

(54) WATERPROOF HOUSING FOR CAMERA (71) Applicant: Shenzhen AEE Technology Co., Ltd., Shenzhen, Guangdong (CN)

(72) Inventor: Xianzhi Zhang, Shenzhen (CN)

(73) Assignee: SHENZHEN AEE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/418,450

(22) PCT Filed: May 22, 2014

(86) PCT No.: PCT/CN2014/078171
§ 371 (c)(1),
(2) Date: Jan. 30, 2015

(87) PCT Pub. No.: WO2015/100925
PCT Pub. Date: Jul. 9, 2015

(65) Prior Publication Data
US 2016/0004142 A1 Jan. 7, 2016

(30) Foreign Application Priority Data
Jan. 6, 2014 (CN) .......................... 2014 1 0005856

(51) Int. Cl.
*G03B 17/08* (2006.01)
*H04N 5/225* (2006.01)

(52) U.S. Cl.
CPC .............. *G03B 17/08* (2013.01); *H04N 5/2252* (2013.01)

(58) Field of Classification Search
CPC .... G03B 17/561; G03B 17/566; G03B 17/56; G03B 17/02; G03B 17/08; G03B 15/05; H04N 5/225; H04N 5/2252; H04N 5/2253; G08B 13/19632
USPC ......... 396/535, 427, 428, 419, 423, 421, 424, 396/25; 348/376, 373, 375; 206/316.1, 206/316.2
See application file for complete search history.

(56) References Cited

U.S. PATENT DOCUMENTS

| | | | |
|---|---|---|---|
| 2006/0008262 A1 | 1/2006 | Watanabe et al. | |
| 2014/0028243 A1* | 1/2014 | Rayner ................... | G06F 1/163 320/103 |
| 2014/0092299 A1* | 4/2014 | Phillips ................ | H04N 5/2251 348/376 |

OTHER PUBLICATIONS

International Search Report of PCT Patent Application No. PCT/CN20141078171 issued on Oct. 10, 2014.

* cited by examiner

*Primary Examiner* — Rochelle-Ann J Blackman (57) ABSTRACT

The present disclosure provides a waterproof housing for a camera. The waterproof housing includes a front housing and a back cover engaging with the front housing, the front housing forms a receiving cavity for receiving the camera and an opening allowing the camera to enter the receiving cavity, a lens window corresponding to a lens of the camera is formed on the front housing, the back cover covers the opening to enclose the receiving cavity; the waterproof housing further includes a fixing device for fixing the waterproof housing to an outer object and the fixing device is detachably mounted on the front housing. The waterproof housing of the present disclosure is capable of meeting various fixing requirements as well as reducing the manufacturing and using cost.

20 Claims, 10 Drawing Sheets

WATERPROOF HOUSING FOR CAMERA

BACKGROUND

1. Technical Field

The present invention relates to cameras, and particularly, to a waterproof housing for a camera.

2. Description of Related Art

At present, a waterproof housing for a camera typically includes a front housing and a back cover fixed to the front housing. The front housing forms a receiving cavity for receiving the camera and forms a lens window corresponding to a lens of the camera. The back cover engages with the front housing to enclose the receiving cavity. However, a fixing device of the waterproof housing which is used for fixing the waterproof housing to other objects is typically integrally formed on a side of the front housing, which prevents the waterproof housing from being fixed to other objects in different ways. In this situation, the whole waterproof housing needs to be replaced on different fixing occasions. This is unable to meet various fixing requirements and is costly. Moreover, for the same type of camera, in the manufacture of different types of waterproof housing which can be fixed to other objects in different ways, an individual set of mould needs to be developed for each type of waterproof housing.

SUMMARY

The main purpose of the present disclosure is to provide a waterproof housing for a camera for meeting various fixing requirements and reducing the manufacturing and using cost.

In order to achieve the above purpose, the present disclosure provides a waterproof housing for a camera, wherein the waterproof housing includes a front housing and a back cover engaging with the front housing, the front housing forms a receiving cavity for receiving the camera and an opening allowing the camera to enter the receiving cavity, a lens window corresponding to a lens of the camera is formed on the front housing, the back cover covers the opening to enclose the receiving cavity; the waterproof housing further includes a fixing device for fixing the waterproof housing to an outer object and the fixing device is detachably mounted on the front housing.

Preferably, the front housing includes a front wall and a side wall extending towards the back cover from an edge of the front wall, the back cover includes an outer surface facing away from the front housing, the fixing device includes a side fixing member and/or a back fixing member, the side fixing member is detachably mounted on the side wall of the front housing, the back fixing member is arranged on the outer surface of the back cover, and the back cover is detachably mounted on the front housing.

Preferably, a mounting hole is defined in the side fixing member, a bolt corresponding to the mounting hole is formed on the side wall, a screw hole is defined in the bolt, the fixing device includes a screw, the screw passes through the mounting hole defined in the side fixing member and is screwed into the screw hole to fix the side fixing member to the side wall of the front housing.

Preferably, the screw includes a first nut, a thread section, and a connecting section connecting between the first nut and the thread section; a maximum outer diameter of the thread section is greater than a maximum outer diameter of the connecting section and is less than a maximum outer diameter of the first nut, and a minimum inner diameter of the mounting hole is less than the maximum outer diameter of the thread section and is no less than the maximum outer diameter of the connecting section.

Preferably, the side fixing member includes a mounting plate and a second nut, the mounting hole is defined in the mounting plate, the mounting plate is detachably mounted on the side wall of the front housing through the screw, the mounting plate includes a first surface facing towards the side wall and a second surface facing away from the side wall, a middle portion of the first surface of the mounting plate is recessed to form a receiving slot, the second nut is arranged in the receiving slot, a through hole which corresponds to a screw hole of the second nut and communicates with the receiving slot is defined in the second surface of the mounting plate, such that a screw bolt on an outer object can be screwed into the screw hole of the second nut after passing through the through hole, thereby fixing the waterproof housing to the outer object.

Preferably, a middle portion of the first surface is recessed to define an inner bottom surface and an inner edge surface, the receiving slot is formed by the inner bottom surface and the inner edge surface, the through hole passes through the inner bottom surface and the second surface, and a mounting protrusion is formed on the inner edge surface such that the second nut can tightly engage with the mounting plate.

Preferably, a plurality of positioning protrusions or positioning recessions are arranged on the second surface of the mounting plate, and the positioning recessions or positioning recessions are arranged around the through hole, spaced from each other and forming an annular.

Preferably, the side wall of the front housing forms a first recession corresponding to the second nut, the side wall further forms a second recession corresponding to the screw hole of the second nut at a middle portion of the first recession, and the distance between the second recession and the mounting plate is greater than the distance between the first recession and the mounting plate.

Preferably, one side of the side fixing member facing the side wall of the front housing forms a positioning cavity corresponding to the bolt, and the bolt is received in the positioning cavity.

Preferably, the side fixing member includes a mounting plate and a connecting portion, the mounting hole is defined in the mounting plate, the mounting plate is detachably mounted on the side wall of the front housing through the screw, the mounting plate includes a first surface facing the side wall and a second surface facing away from the side wall, and the connecting portion is formed on the second surface of the mounting plate to be fixed to the outer object.

Preferably, the connecting portion includes a plurality of connecting plates perpendicular to the mounting plate, the connecting plates are parallel with each other and spaced from each other, and a fixing hole penetrating the connecting plates is defined in the connecting portion.

Preferably, one end of the connecting portion away from the mounting plate forms a ball head.

Preferably, the back fixing member includes a supporting plate and two band fastening structures respectively arranged on two opposite sides of the supporting plate, the supporting plate and the back cover are integrally formed, or the supporting plate is detachably mounted on the outer surface of the back cover.

Preferably, the band fastening structure includes a sleeve rod with two ends thereof being connected to the supporting plate, and the sleeve rod and the supporting plate form elongated sleeve hole.

Preferably, a middle portion of the sleeve rod forms a fracture allowing a band to sleeve thereon.

Preferably, four elongated mounting holes are defined in the supporting plate, screw holes corresponding to the mounting holes are defined in the outer surface of the back cover, the mounting holes are arranged around a center of the supporting plate to form an annular such that the screw can pass therethrough to be screwed into the corresponding screw hole, thereby detachably mounting the supporting plate onto the back cover.

Preferably, the back fixing member includes a couple of clamping plates, a pivot, and an elastic member; the pivot is arranged on middle portions of the clamping plates to rotatably connect the clamping plates; one ends of the clamping plates form a couple of clamping heads, the other ends of the clamping plates form a couple of handles; and the elastic member abuts two opposite inner surfaces of the handles to provide a clamping force to the clamping heads such that the clamping heads can clamp the outer object.

Preferably, the clamping plates includes a first clamping plate adjacent to the back cover and a second clamping plate away from the back cover, a first mounting hole is defined in an outer surface of the back cover and a second mounting hole is defined in the first clamping plate to tightly engage with a fastener to mount the first clamping plate onto the back cover; the first clamping plate includes an outer side surface facing the back cover and an inner side surface facing the second clamping plate, an elastic arm extends from the first clamping plate towards the back cover, the elastic arm protrudes from the outer side surface of the first clamping plate and includes a contact surface facing the back cover, a first bulking structure is arranged on the contact surface of the elastic arm, a plurality of second bulking structures engageable with the first bulking structure are arranged on the outer surface of the back cover, the second bulking structures are arranged around a center of the first mounting hole in the back cover and forms an annular, and the first bulking structure is clamped onto one of the second bulking structures.

Preferably, a protruding stage is arranged on one side of the back cover facing towards the back fixing member, the first mounting hole and the second buckling structures are formed in the protruding stage, a first positioning structure is arranged on the outer side surface of the first clamping plate, a second positioning structure corresponding to the first positioning structure is arranged on the protruding stage, and the first positioning structure engages with the second positioning structure to mount and fix the first clamping plate and the back cover.

Preferably, an outer surface of the front housing is recessed to define an inner bottom surface and inner edge surface corresponding to the lens window, the inner bottom surface and the inner edge surface form an accommodating slot, the front housing defines a first through hole at a middle portion of the inner bottom surface, a double-sided adhesive tape and a lens are arranged in the accommodating slot, a second through hole corresponding to the first through hole is defined in the double-sided adhesive tape, and the double-sided adhesive tape is located between the inner bottom surface of the front housing and the lens to bond the lens on the front housing.

In the waterproof housing for a camera provided in the present disclosure, the fixing device includes the side fixing member and/or the back fixing member, the side fixing member is detachably mounted on the side wall of the front housing, the back fixing member is arranged on the outer surface of the back cover, the back cover is detachably mounted on the front housing, that is, the back fixing member is indirectly detachably mounted on the front housing through the back cover, thus, the side fixing member or the back fixing member can be selected to fix the waterproof housing on different fixing occasions. When the side fixing member or the back fixing member currently being used cannot meet the fixing requirements, the side fixing member or the back fixing member currently being used can be replaced by other side fixing members or back fixing members to meet various types of fixing requirements without replacing the whole waterproof housing, which saves the cost of using the waterproof housing. In addition, since the same front housing can be shared by one type of camera device on different fixing occasions, that is, only one set of mould should be developed for the front housing having a complex structure, the cost of the development of the mould can be greatly reduced.

The realization of the object, features, and advantages of the present disclosure are given in further detail in combination with the embodiments with reference to the accompanying drawings.

DETAILED DESCRIPTION

It should be understood that the embodiments described herein are only used to explain the present disclosure rather than to limit the present disclosure.

The present disclosure provides a waterproof housing for a camera. In the accompanying drawings provided in the present disclosure including FIG. 1 to FIG. 18, identical labels in different figures representing different embodiments indicate the same components or structures, and labels in different embodiments are cross reference.

Referring to FIGS. 1 to 7, in a first embodiment, a waterproof housing 100 for a camera includes a front housing 10 and a back cover 20 engaging with the front housing 10. The front housing 10 forms a receiving cavity 11 for receiving the camera and an opening 12 allowing the camera to enter the receiving cavity 11. A lens window 13 corresponding to a lens of the camera is formed on the front housing 10, and the back cover 20 covers the opening 12 to enclose the receiving cavity 11. The waterproof housing 100 further includes a fixing device 30 for fixing the waterproof housing 100 to other objects. The fixing device 30 is detachably mounted on the front housing 10.

In the above waterproof housing 100, the fixing device 30 is detachably mounted on the front housing 10, thus, different fixing requirements on different fixing occasions can be met by replacing the fixing device 30 with another fixing device. In this way, it is unnecessary to replace the whole waterproof housing 100 and the cost of using the waterproof housing 100 is saved. In addition, the front housing 10 can be shared on different fixing occasions, that is, only one set of mould should be developed for the front housing 10 having a complex structure, which greatly reduces the cost for the development of the mould.

Figure 1:
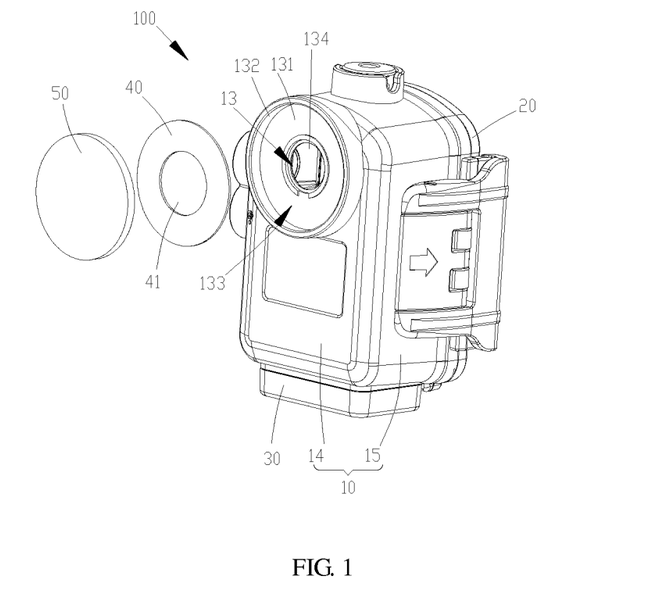
FIG. 1 is a partially exploded view of a waterproof housing for a camera in accordance with a first embodiment of the present disclosure.
Figure 2:
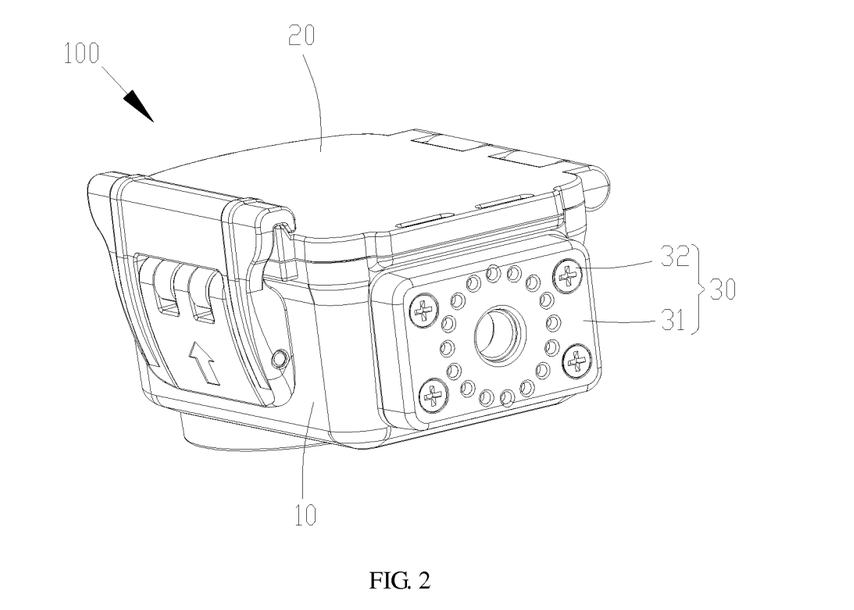
FIG. 2 is an assembly view of the waterproof housing of FIG. 1 viewed from another angle.

Referring to FIGS. 1 and 2, the front housing 10 includes a front wall 14 and a side wall 15 extending towards the back cover 20 from an edge of the front wall 14. In the embodiment, the fixing device 30 includes a side fixing member 31 which is detachably mounted on the side wall 15 of the front housing 10.

Referring to FIGS. 3 to 6, four mounting holes 311 are defined in the side fixing member 31 and are respectively adjacent to four corners of the side fixing member 31, and four bolts 151 corresponding to the four mounting holes 311 are arranged on the side wall 15 of the front housing 10. A screw hole 1511 is defined in each blot 151. The fixing device 30 further includes four screws 32. Each screw 32 passes through the corresponding mounting hole 311 defined in the side fixing member 31 and then is screwed into the corresponding screw hole 1511, thereby fixing the side fixing member 31 to the side wall 15 of the front housing 10. The arrangement and the number of the mounting hole 311 and the bolt 151 are not limited to this embodiment. In other embodiments, more than or less than four mounting holes 311 or bolts 151 can be provided, for example, two mounting holes 311 or bolts 151 are arranged opposite to each other or diagonally.

Figure 7:
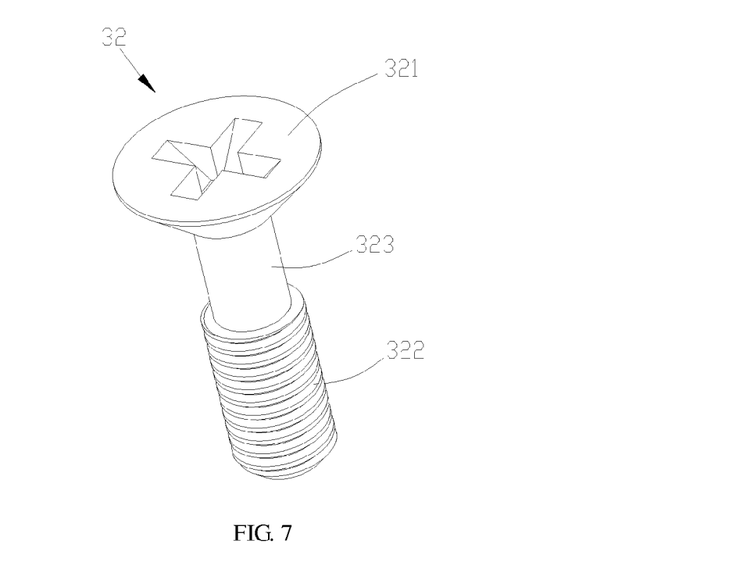
FIG. 7 is a schematic view of a screw for fixing the side fixing member of the waterproof housing of FIG. 4.

Referring also to FIG. 7, each screw 32 includes a first nut 321, a thread section 322, and a connecting section 323 connected between the first nut 321 and the thread section 322. The maximum outer diameter of the thread section 322 is greater than the maximum outer diameter of the connecting section 323 and is less than the maximum outer diameter of the first nut 321, the minimum inner diameter of the mounting hole 311 is less than the maximum outer diameter of the thread section 322 and is no less than the maximum outer diameter of the connecting section 323, thus, the screw 32 can be pre-mounted onto the side fixing member 31. In this way, the screw 32 can be prevented from falling from the side fixing member 31 and the loss of the screw occurred during the replacement of the side fixing member 31 can be avoided, which is convenient for the user to replace the side fixing member 31.

Figure 5:
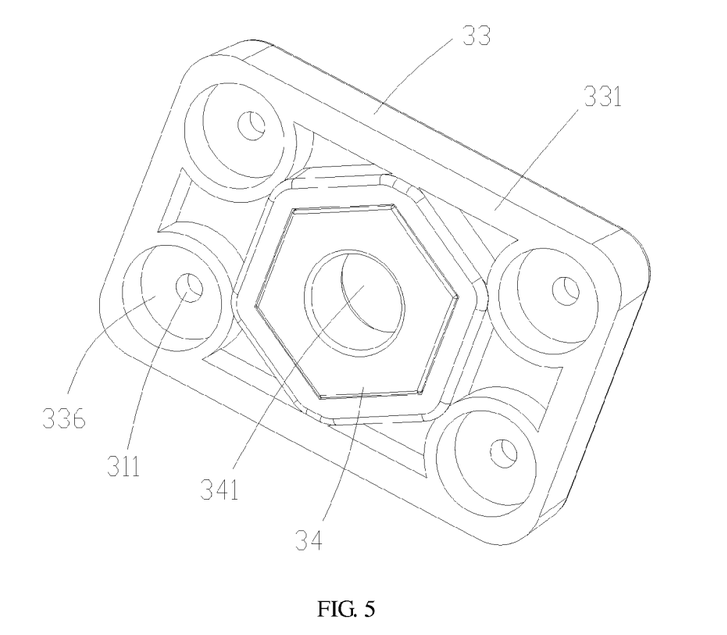
FIG. 5 is an assembly view of a side fixing member of the waterproof housing of FIG. 4.
Figure 6:
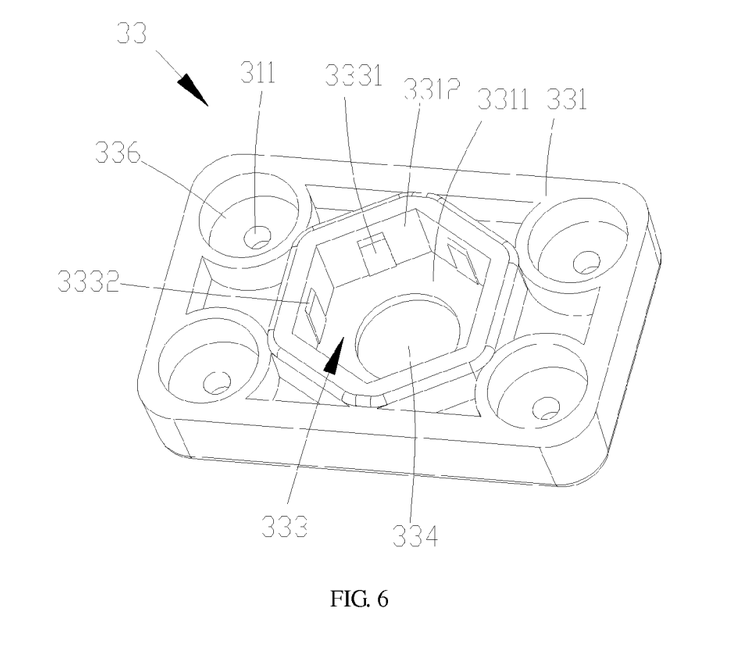
FIG. 6 is a schematic view of a mounting plate of the side fixing member of FIG. 5.

The side fixing member 31 includes a mounting plate 33 and a second nut 34. The mounting hole 311 is defined in the mounting plate 33. The mounting plate 33 is detachably mounted on the side wall 15 of the front housing 10 via the screw 32. The mounting plate 33 includes a first surface 331 facing towards the side wall 15 and a second surface 332 facing away from the side wall 15. The middle portion of the first surface 331 is recessed to form a receiving slot 333 for receiving the second nut 34. A through hole 334 is defined in the second surface 332, corresponding to a screw hole 341 of the second nut 34 and communicating with the receiving slot 333. Thus, the screw bolt of an outer object can be screwed into the screw hole 341 of the second nut 34 after passing through the through hole 334, thereby fixing the waterproof housing 10 to an outer object.

The middle portion of the first surface 331 of the mounting plate 33 is recessed to define an inner bottom surface 3311 and an inner edge surface 3312. The receiving slot 333 is surrounded by the inner bottom surface 3311 and the inner edge surface 3312. The through hole 334 penetrates the inner bottom surface 3311 and the second surface 332. A mounting protrusion 3331 is formed on the inner edge surface 3312 such that the second nut 34 can tightly engage with the mounting plate 33, which realizes the pre-assembly of the second nut 34 and the mounting plate 33 and prevents the second nut 34 from falling out of the receiving slot 333 and thus facilitates the assembly of the side fixing member 31.

In the embodiment, the mounting protrusion 3331 is a protruding rib, and one end of the mounting protrusion 3331 adjacent to the first surface 331 is wedge-shaped to allow the second nut 34 to be mounted into the receiving slot 333 easily.

A number of positioning recessions 335 are formed on the second surface 332 of the mounting plate 33. The positioning recessions 335 are arranged around the through hole 334, forming an annular and evenly spaced from each other. In other embodiments, the positioning recessions 335 can be replaced by positioning protrusions. Preferably, the positioning recessions 335 are evenly spaced from each other. More preferably, the number of the positioning recessions 335 formed on the second surface 332 of the mounting plate 33 may be twelve, twenty-four, or thirty-six.

Figure 3:
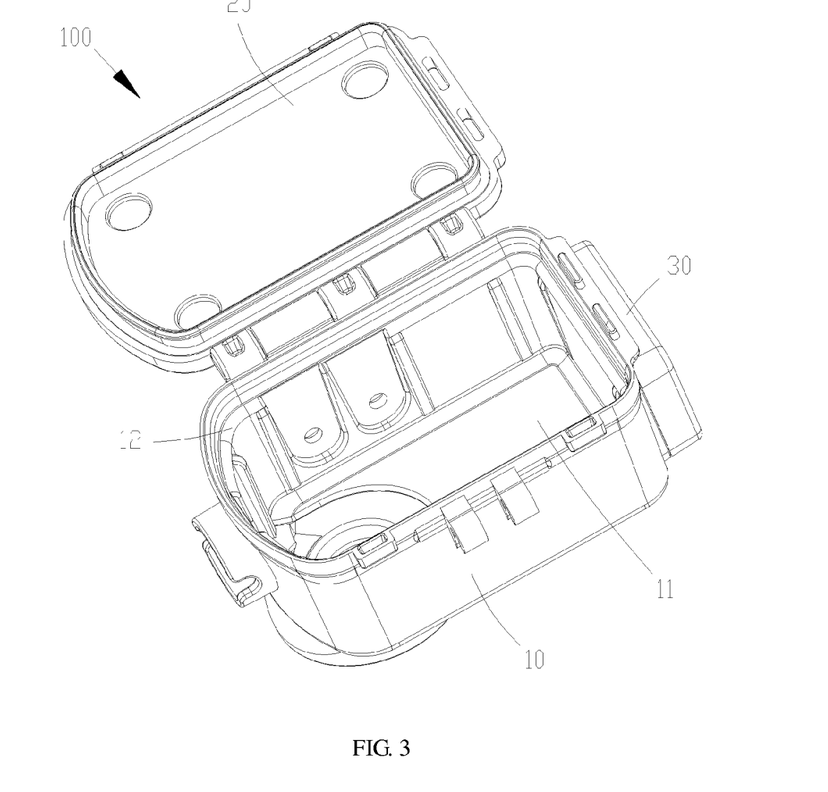
FIG. 3 is a schematic view showing that a front housing and a back cover of the waterproof housing of FIG. 2 are in open states.
Figure 4:
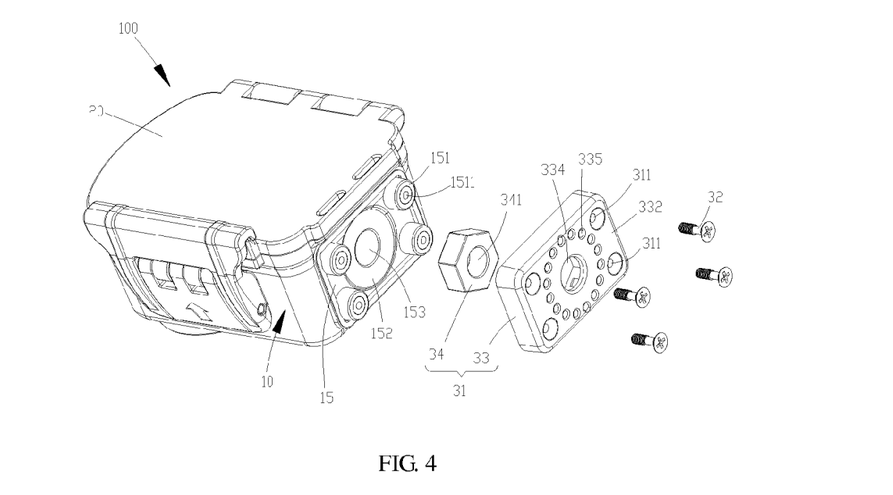
FIG. 4 is a partially exploded view of the waterproof housing of FIG. 2.

The side wall 15 of the front housing 10 forms a first recession 152 which corresponds to the second nut 34. The side wall 15 further forms a second recession 153 which corresponds to the screw hole 341 of the second nut 34 at the middle portion of the first recession 152. The distance between the second recession 153 and the mounting plate 33 is greater than the distance between the first recession 152 and the mounting plate 33. Since the front housing 10 is generally made of plastic, the second recession 153 can provide a space for the screw 32 when the side fixing member 31 is being mounted, thereby effectively avoiding the damage of the side wall 15 of the front housing 10 caused by strong squeeze.

One side of the side fixing member 31 facing the side wall 15 of the front housing 10 forms a positioning cavity 336 corresponding to the corresponding bolt 151. The bolt 151 is received in the positioning cavity 336 to pre-position the side fixing member 31 and the front housing 10, allowing the screw 32 to be screwed into the screw hole 1511 easily.

In the embodiment, the second nut 34 is formed on the mounting plate 33 as a connecting portion to be fixed to the outer object. In other embodiments, the second nut 34 can be replaced by other types of connecting portions such as a connecting plate or a ball head with connecting holes.

In the embodiment, the outer surface of the front housing 10 is recessed to define an inner bottom surface 131 and an edge surface 132 which correspond to the lens window 13. The inner bottom surface 131 and the inner edge surface 132 form an accommodating slot 133. The front housing 10 defines a first through hole 134 which corresponds to the lens of the camera device at the middle portion of the inner bottom surface 131. A double-sided adhesive tape and a lens 50 are arranged inside the accommodating slot 133. A second through hole 41 corresponding to the first through hole 134 is defined in the double-sided adhesive tape 10. The double-sided adhesive tape 40 is located between the inner bottom surface 131 of the front housing 10 and the lens 50 to bond the lens 50 to the front housing 10. Compared with known methods, the lens 50 is bonded to the front housing by the double-sided adhesive tape 40 without sealing rings and glands and screws. Thus, the operation is simple. With the accommodating slot 133 receiving the lens 50, the lens 50 can be well protected.

Figure 8:
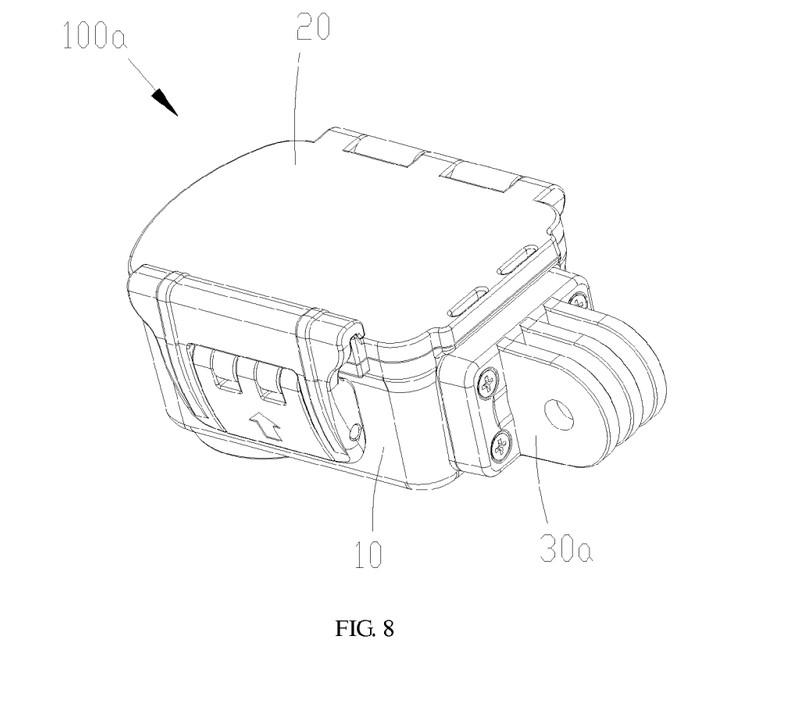
FIG. 8 is an assembly view of a waterproof housing for a camera in accordance with a second embodiment of the present disclosure.
Figure 9:
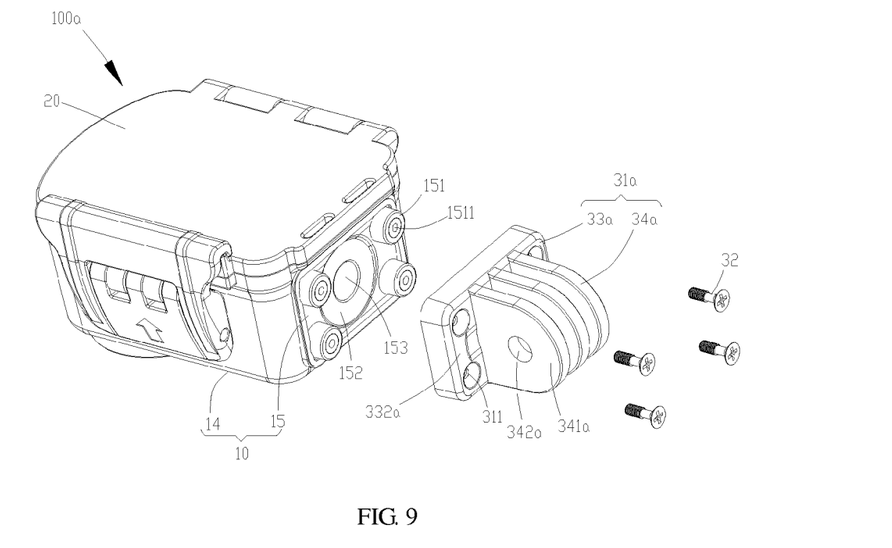
FIG. 9 is a partially exploded view of the waterproof housing of FIG. 8.
Figure 10:
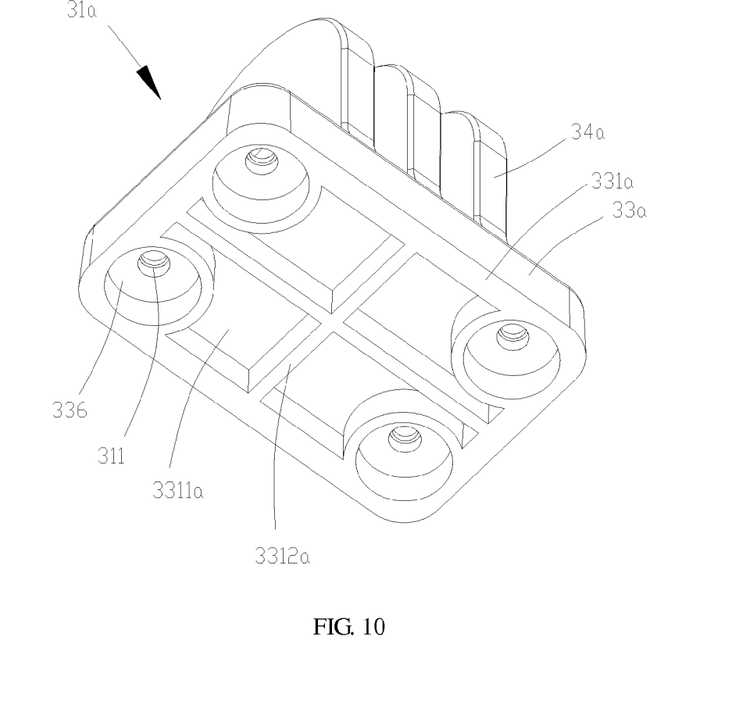
FIG. 10 is a schematic view of a side fixing member of the waterproof housing of FIG. 9.

Referring to FIGS. 8 to 10, a waterproof housing for a camera in accordance with a second embodiment is provided. In the embodiment, the waterproof housing 100a includes a front housing 10 and a back cover 20 engaging with the front housing 10. The front housing 10 forms a receiving cavity 11 for receiving the camera and an opening 12 (as shown in FIG. 3) allowing the camera to enter the receiving cavity 11. A lens window 13 (as shown in FIG. 1) corresponding to a lens of the camera is formed on the front housing 10, and the back cover 20 covers the opening 12 to enclose the receiving cavity 11. The waterproof housing 100a further includes a fixing device 30 for fixing the waterproof housing 100a to an outer object. The fixing device 30 is detachably mounted on the front housing 10.

Referring to FIG. 9, the front housing 10 includes a front wall 14 and a side wall 15 extending towards the back cover 20 from an edge of the front wall 14. In the embodiment, the fixing device 30a includes a side fixing member 31a which is detachably mounted on the side wall 15 of the front housing 10. For detailed structures of the front housing 10 and the back cover 20, please see the description in the first embodiment.

The difference between the waterproof housing 100a of this embodiment and that of the first embodiment lies in the side fixing member 31a. In the embodiment, the side fixing member 31a includes a mounting plate 33a and a connecting portion 34a. The mounting hole 311 is defined in the mounting plate 33a, and the mounting plate 33a is detachably mounted on the side wall 15 of the front housing 10 through the screws 32. The mounting plate 33a includes a first surface 331a facing towards the side wall 15 and a second surface 332a facing away from the side wall 15. The connecting portion 34a is formed on the second surface 332a of the mounting plate 33 for fixing to the outer object. For detailed structure of the screw 32, please see the description in the first embodiment and FIG. 7.

In the above waterproof housing 100a, the fixing device 30a is detachably mounted on the front housing 10, thus, different fixing requirements on different fixing occasions, can be met by replacing the fixing device 30a with another fixing device. In this way, it is unnecessary to replace the whole waterproof housing 100a and the cost of using the waterproof housing 100a is saved. In addition, the front housing 10 can be shared on different fixing occasions, that is, only one set of mould should be developed for the front housing 10 having a complex structure, which greatly reduces the cost for the development of the mould.

A number of grooves 3311a are formed on the first surface 331a of the mounting plate 33a, and a reinforcing rib 3312a is formed between two adjacent grooves 3311a.

The connecting portion 34a includes a number of connecting plates 341a perpendicular to the mounting plate 33a. The connecting plates 341a are parallel with each other and are spaced from each other, and the connecting portion 34a further defines fixing hole 342a penetrating the connecting plates 341a. The structure of the connecting portion 34a is not limited to this embodiment; in other embodiments, the connecting portion can form a ball head at one end thereof which is away from the mounting plate 33a.

One side of the side fixing member 31 facing the side wall 15 is recessed to form a positioning cavity 336 corresponding to the bolt 151. The bolt 151 is received in the positioning cavity 336 to prefix the side fixing member 31a and the front housing 10, thereby allowing the screw 32 to be screwed into the screw hole 1511 of the bolt 151 easily.

Figure 11:
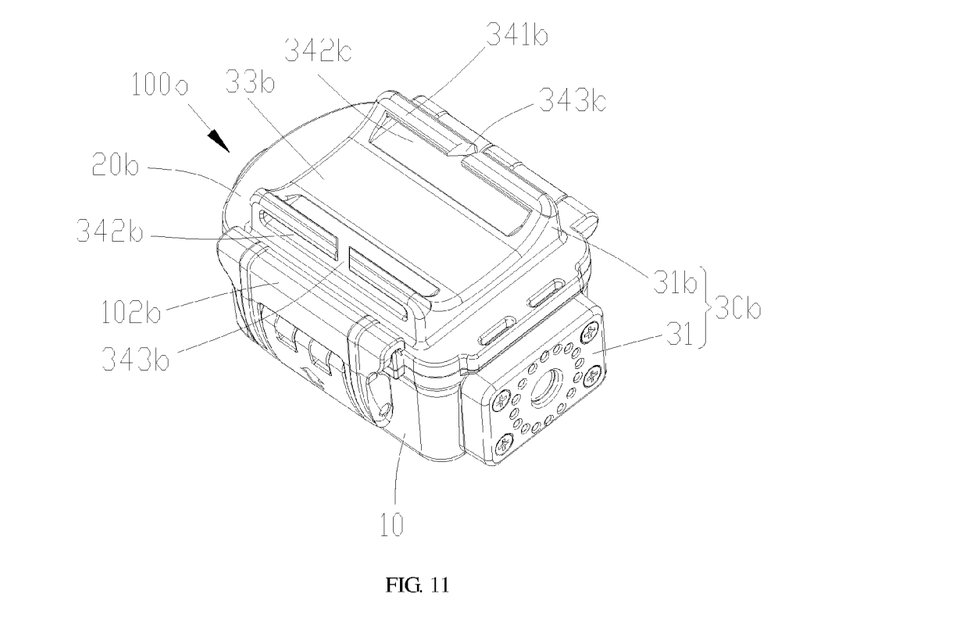
FIG. 11 is an assembly view of a waterproof housing for a camera in accordance with a third embodiment of the present disclosure.
Figure 12:
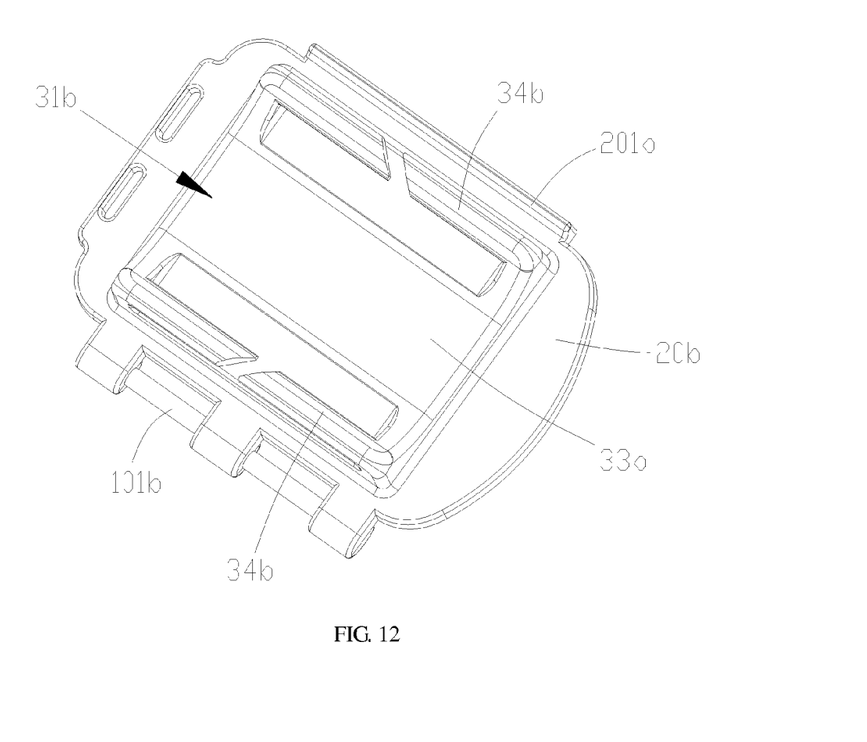
FIG. 12 is a schematic view of a back cover of the waterproof housing of FIG. 11.

As shown in FIGS. 11 and 12, a waterproof housing for a camera in accordance with a third embodiment is provided. In the embodiment, the waterproof housing 100b includes a front housing 10 and a back cover 20b engaging with the front housing 10. The front housing 10 forms a receiving cavity 11 for receiving the camera and an opening 12 (as shown in FIG. 3) allowing the camera to enter into the receiving cavity 11. A lens window 13 (as shown in FIG. 1) corresponding to a lens of the camera is formed on the front housing 10. The back cover 20b covers the opening 12 of the front housing 10 to enclose the receiving cavity 11. The waterproof housing 100b further includes a fixing device 30b for fixing the waterproof housing 100b to an outer object. The fixing device 30b is detachably mounted on the front housing 10.

The front housing 10 includes a front wall 14 and a side wall 15 (as shown in FIG. 9) extending towards the back cover from an edge of the front wall 14. The back cover 20b includes an outer surface facing away from the front housing 10. The fixing device 30b includes a side fixing member 31 and a back fixing member 31b. The side fixing member 31 is detachably mounted on the side wall 15 of the front housing 10, the back fixing member 31b is arranged on the outer surface of the back cover 20b, and the back cover 20b is detachably mounted on the front housing 10. For detailed structures of the front housing 10 and the side fixing member 31, please see the description in the first embodiment and in FIGS. 1 to 6.

The back fixing member 31b includes a supporting plate 33b and two band fastening structures 34b respectively arranged on two opposite sides of the supporting plate 33b. In the embodiment, the supporting plate 33b and the back cover 20b are integrally formed. In other embodiments, the supporting plate 33b and the back cover 20b are separated from each other, and the supporting plate 33b is detachably mounted on the outer surface of the back cover 20b.

In the waterproof housing 100b, the fixing device 30b includes the side fixing member 31 and the back fixing member 31b; the side fixing member 31 is detachably mounted on the side wall 15, the back fixing member 31b is arranged on the outer surface of the back cover 20b, the back cover 20b is detachably mounted on the front housing 10, that is, the back fixing member 31b can be detachably mounted on the front housing 10 by the back cover 20b indirectly. In this way, on different fixing occasions, the side fixing member 31 or the back fixing member 31b can be selected to fixing the waterproof housing 100. If the side fixing member 31 or the back fixing member 31b being currently used cannot meet the fixing requirements, the side fixing member 31 or the back fixing member 31b being currently used can be replaced by other side fixing members or back fixing members to meet various types of fixing requirements without replacing the whole waterproof housing 100b, which saves the cost of using the waterproof housing 100b. In addition, since the same front housing 10 can be shared by one type of camera device on different fixing occasions, that is, only one set of mould should be developed for the front housing 10 having a complex structure, the cost of the development of the mould can be greatly reduced.

In the embodiment, one side of the front housing 10 is detachably hinged to a corresponding side of the back cover 20b via a pivot 101b. The other side of the front housing 10 is provided with a first clamping structure 102b, and the other side of the back cover 20b is correspondingly provided with a second clamping structure 201b. The back cover 20b is detachably mounted on the front housing 10 by clamping the first clamping structure 102b and the second clamping structure 201b together. The way that the front housing 10 is connected to the back cover 20b in this embodiment can also be applied to the aforementioned first and second embodiments and the subsequent fourth and fifth embodiments.

In the embodiment, the fixing device 30b includes the side fixing member 31 and the back fixing member 31b; in other embodiments, the fixing device 30b can only include the back fixing member 31b. It can be understood that the back fixing member 31b of the embodiment can also be applied in the waterproof housing 100a of the second embodiment. In other words, the side fixing member 31 of the embodiment can be replaced by the side fixing member 31a of the second embodiment.

In the embodiment, the side fixing member 31 is detachably mounted on the side wall 15 of the front housing 10, the back fixing member 31b is arranged on the outer surface of the back cover 20b, and the back cover 20b is detachably mounted on the front housing 10. It can be understood that in other embodiments, the side fixing member 31 of the embodiment can be arranged on the outer surface of the back cover 20b, or the back fixing member 31b can be detachably mounted on the side wall 15 of the front housing 10. It is noted that the side fixing member 31a of the second embodiment can also be arranged on the outer surface of the back cover 20b, and the back fixing member 31c of the subsequent fourth embodiment and the back fixing member 31d of the following fifth embodiment can also be arranged on the outer surface of the back cover 20b.

The band fastening structure 31b includes a sleeve rod 341b. Two ends of the sleeve rod 341b are connected to the supporting plate 33b, and the sleeve rod 341b and the supporting plate 33b together define an elongated sleeve hole 342b.

The middle portion of the sleeve rod 341b forms a fracture 343b which allows the band, especially the annular band, to sleeve thereon.

Figure 13:
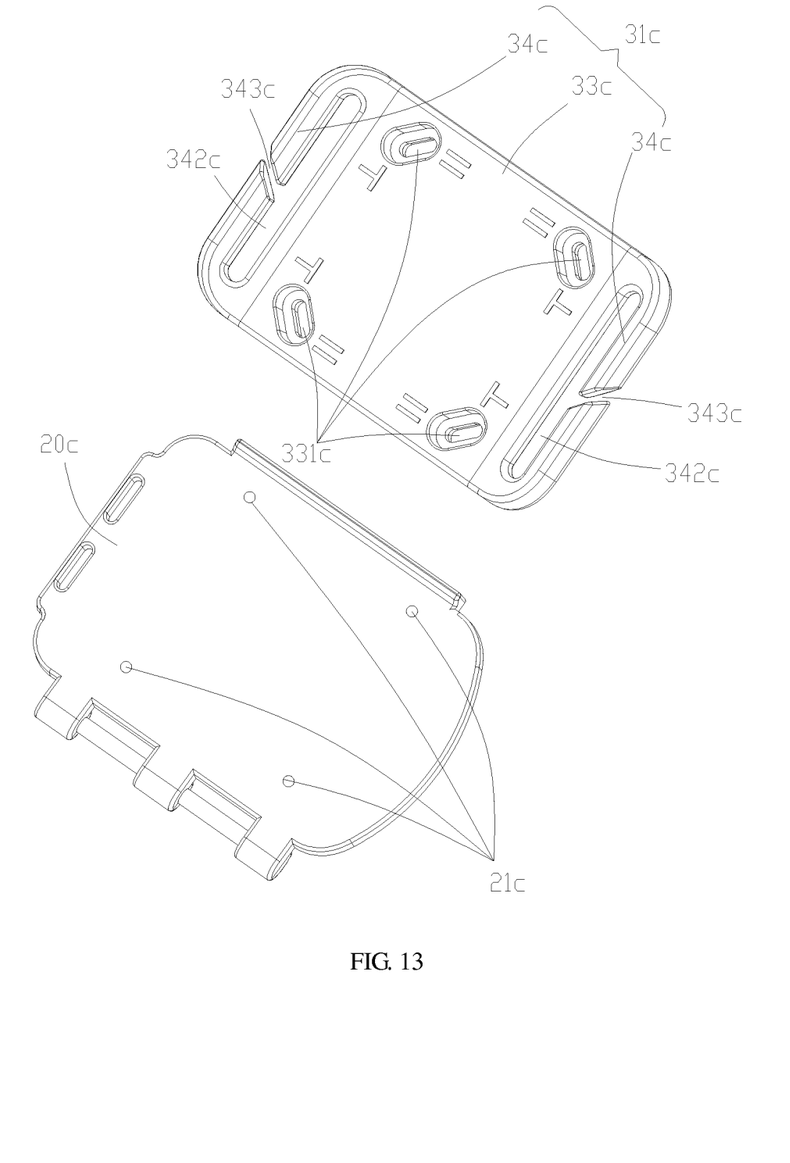
FIG. 13 is a schematic view of a back cover and a back fixing member of a waterproof housing for a camera in accordance with a fourth embodiment of the present disclosure.
Figure 14:
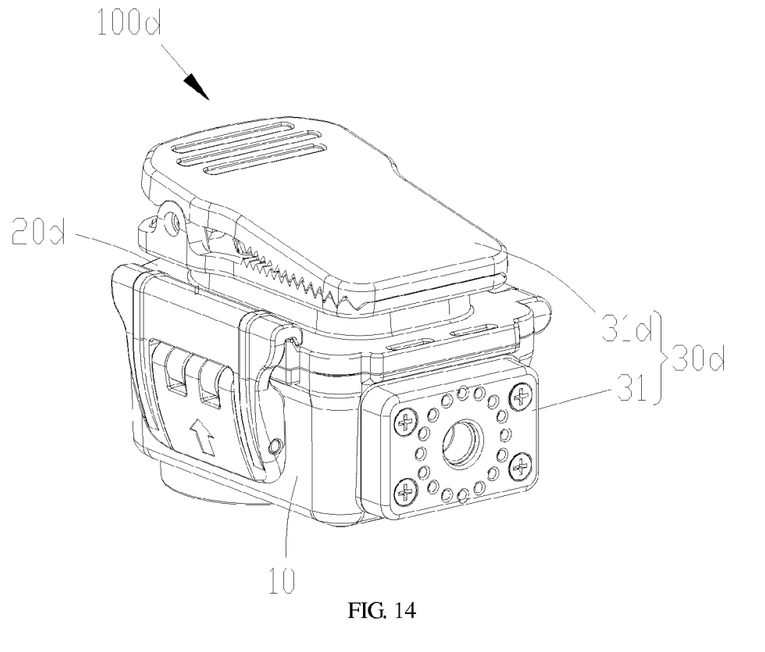
FIG. 14 is an assembly view of a waterproof housing for a camera in accordance with a fifth embodiment of the present disclosure.

As shown in FIG. 13, a waterproof housing for a camera in accordance with a fourth embodiment is provided. FIG. 13 is the partially exploded view of a back cover 20c and a back fixing member 31c of the waterproof housing. In the embodiment, structures of other parts of the waterproof housing not shown in FIG. 13 are similar to the structures shown in the aforementioned third embodiment. The difference between the waterproof housing of the embodiment and that of the third embodiment lies in the back cover 20c and the back fixing member 31c.

In the embodiment, the back cover 20c and the back fixing member 31c are separated from each other. The back fixing member 31c includes a supporting plate 33c and two band fastening structures 34c respectively arranged at two opposite ends of the supporting plate 33c. Four elongated mounting holes 331c are defined in the supporting plate 33c, and screw holes 21c corresponding to the mounting holes 331c are defined in the outer surface of the back cover 20c. The four mounting holes 331c are arranged around the center of the supporting plate 33c and form an annular, allowing screws to pass therethrough to be screwed into corresponding screw holes 21c and thereby detachably mounting the supporting plate 33c onto the back cover 20c. The screws can be the screws 32 shown in FIG. 7 and the structures of the screws 32 are similar to that in the first embodiment. In the embodiment, when the back fixing member 31c is fixed to the back cover 20c in parallel, the screws are located at the positions shown in FIG. 13 shaped as "T"; when the back fixing member 31c is fixed to the back cover 20c in perpendicular, the screws are located at the positions shown in FIG. 13 shaped as "||", thus, the direction of the waterproof housing can be adjusted.

The band fastening structures 34c includes a sleeve rod with two ends thereof connected to the supporting plate 33c. The sleeve rod and the supporting plate 33c together form an elongated sleeve hole 342c.

The middle portion of the sleeve rod forms a fracture 343c which allows the bands, especially the annular bands, to sleeve thereon.

As shown in FIGS. 14 to 18, a waterproof housing in accordance with a fifth embodiment is provided. In the embodiment, the waterproof housing 100d includes a front housing 10 and a back cover 20d engaging with the front housing 10. The front housing 10 forms a receiving cavity 11 for receiving the camera and an opening 12 (as shown in FIG. 3) allowing the camera to enter the receiving cavity 11. A lens window 13 (as shown in FIG. 1) corresponding to a lens of the camera is formed on the front housing 10. The back cover 20d covers the opening 12 to enclose the receiving cavity 11. The waterproof housing 100d further includes a fixing device 30d for fixing the camera device to an outer object. The fixing device 30d is detachably mounted on the front housing 10.

The front housing 10 includes a front wall 14 and a side wall 15 (as shown in FIG. 9) extending towards the back cover from an edge of the front wall 14. The back cover 20d includes an outer surface facing away from the front housing 10. The fixing device 30d includes a side fixing member 31 and a back fixing member 31d. The side fixing member 31 is detachably mounted on the side wall 15, the back fixing member 31d is arranged on the outer surface of the back cover 20d, and the back cover 20d is detachably mounted on the front housing 10. For detailed structures of the front housing 10 and the side fixing member 31, please see the description in the first embodiment.

Figure 15:
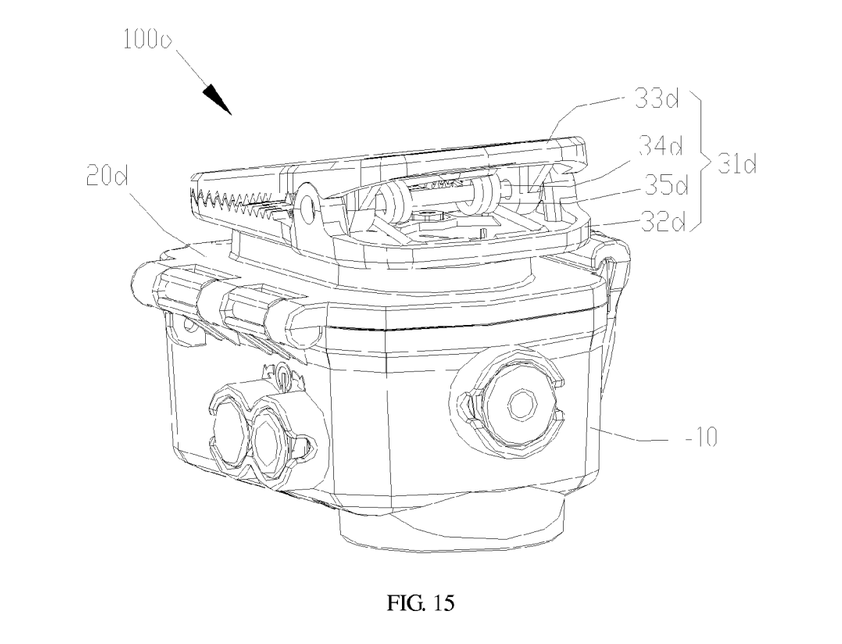
FIG. 15 is an assembly view of the waterproof housing of FIG. 14 viewed from another angle.
Figure 16:
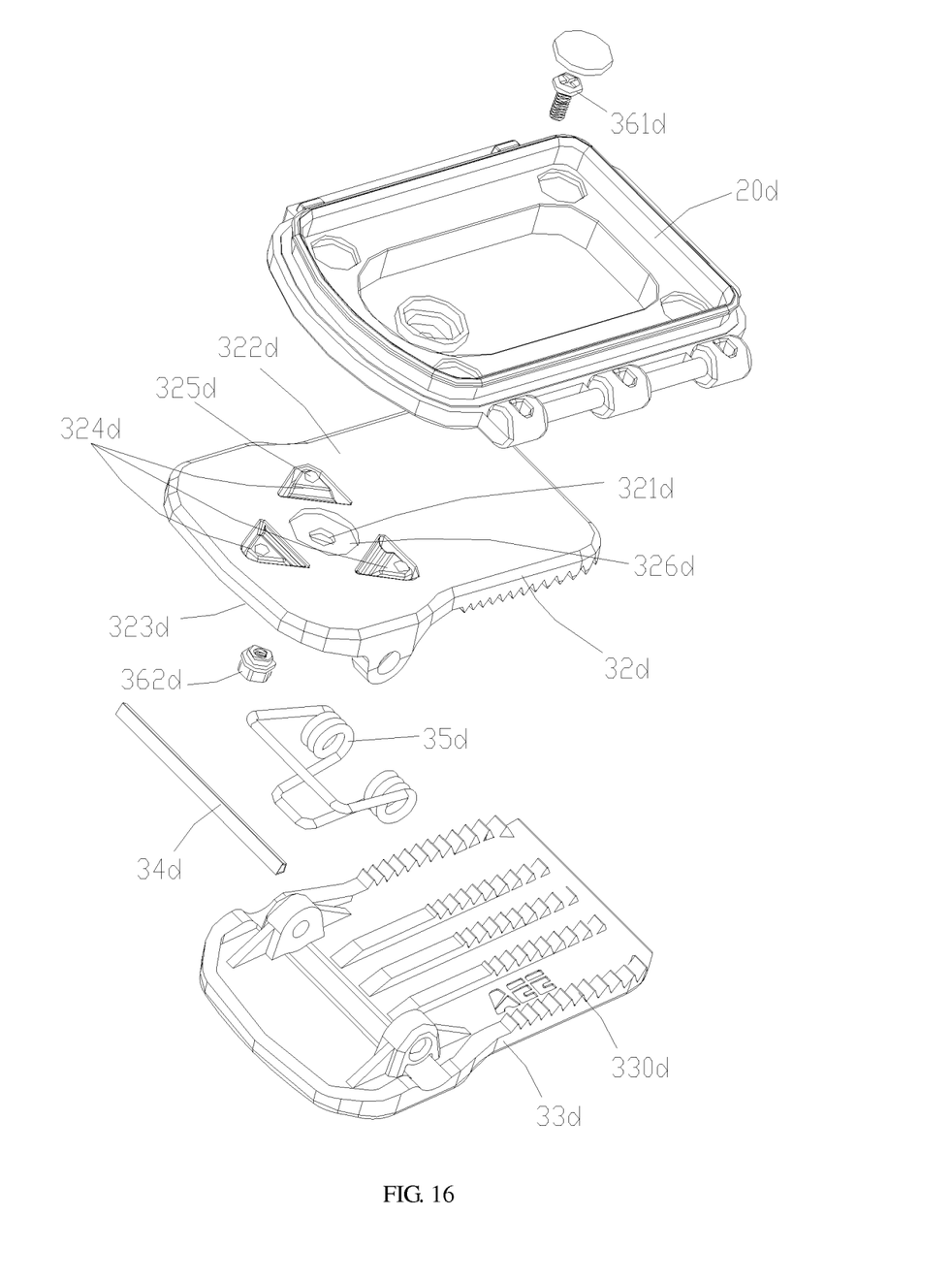
FIG. 16 is an exploded view of the waterproof housing of FIG. 14 in which a front housing thereof is not shown.

The back fixing member 31d includes a couple of clamping plates 32d, 33d, a pivot 34d, and an elastic member 35d. The pivot 34d is arranged on the middle portions of the clamping plates 32d, 33d to rotatably connect the clamping plates 32d and 33d. One ends of the clamping plates 32d, 33d form a couple of clamping heads, and the other ends of the clamping plates 32d, 33d form a couple of handles (as shown in FIG. 15, opened front ends of the clamping plates 32d, 33d form the couple of handles, and closed rear ends of the clamping plates 32d, 33d form the couple of clamping heads). The elastic member 35 abuts opposite inner surfaces of the handles to provide a clamping force to the clamping head such that the clamping head can clamp the outer object.

Figure 17:
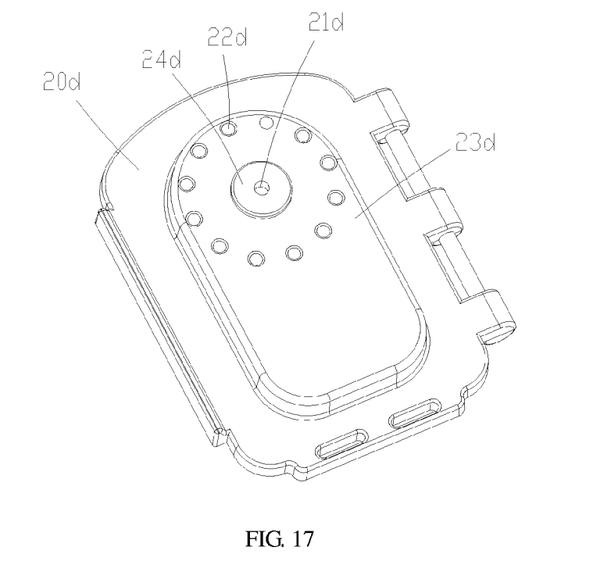
FIG. 17 is a schematic view of a back cover of the waterproof housing of FIG. 16 viewed from another angle.
Figure 18:
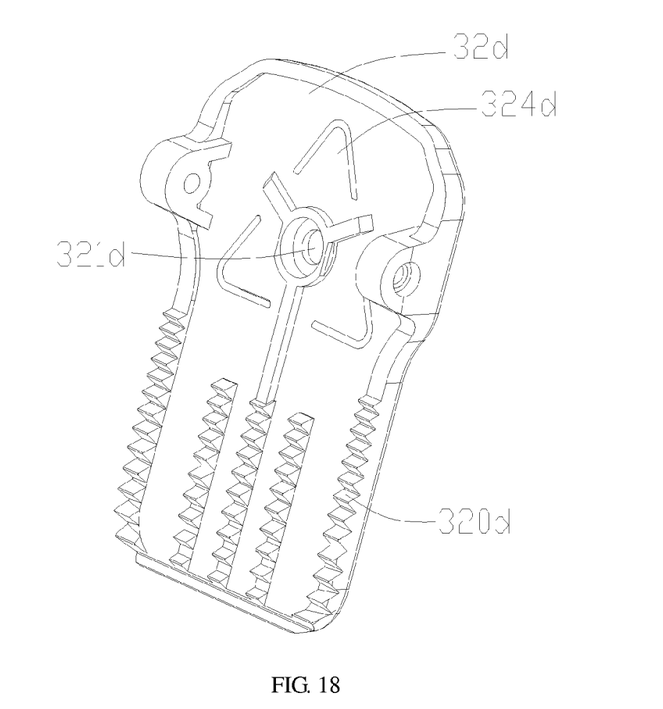
FIG. 18 is a schematic view of a first clamping plate of a back fixing member of the waterproof housing of FIG. 16 viewed from another angle.

The clamping plates 32d, 33d include the first clamping plate 32d adjacent to the back cover 20d and the second clamping plate 33d away from the back cover 20d. A first mounting hole 21d is defined in the outer surface of the back cover 20d, and a second mounting hole 321d is defined in the first clamping plate 32d to engage with a fastener to mount the first clamping plate 32d on the back cover 20d. The first clamping plate 32d includes an outer side surface 322d facing the back cover 20d and an inner side surface 323d facing the second clamping plate 33d. An elastic arm 324d extends towards the back cover 20d from the first clamping plate 32d. The elastic arm 324d protrudes from the outer side surface 322d of the first clamping plate 32d. The elastic arm 324d includes a contact surface facing the back cover 20d with a first buckling structure 325d formed thereon. A number of second buckling structures 22d engageable with the first buckling structure 325d are formed on the outer surface of the back cover 20d. The second buckling structures 22d surround the center of the first mounting hole 21d and form an annular. The first buckling structure 325d is clamped onto one of the second buckling structures 22d. Preferably, the second buckling structures 22d surround the first mounting hole 21d, evenly spaced from each other and forming an annular. More preferably, the number of the second buckling structures 22d formed on the outer surface of the back cover may be twelve, twenty-four, or thirty-six.

In the embodiment, the first buckling structure 325d is a protrusion, and the second buckling structures 22d are recessions. In other embodiments, the first buckling structure 325d may be a recession and the second buckling structures 22d may be protrusions.

One side of the back cover 20d facing the back fixing member 31d is provided with a protruding stage 23d, and the first mounting hole 21d and the second buckling structures 22d are arranged on the protruding stage 23d. A first positioning structure 326d is arranged on the outer surface of the first clamping plate 32d, and a second positioning structure 24d corresponding to the first positioning structure 326d is arranged on the protruding stage 23d. The first positioning structure 326d engages with the second positioning structure 24d to fix the first clamping plate 32d and the back cover 20d.

In the embodiment, a first skid-proof structure 320d and a second skid-proof structure 330d are respectively arranged on opposite inner surfaces of the clamping heads of the clamping plates 32d, 33d, such that the clamping plates 32d, 33d can be well clamped onto the outer object. In specific, the first skid-proof structure 320d and the second skid-proof structure 330d respectively include a number of parallel tooth ribs.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A waterproof housing for a camera, wherein the waterproof housing comprises a front housing and a back cover engaging with the front housing, the front housing forms a receiving cavity for receiving the camera and an opening allowing the camera to enter the receiving cavity, a lens window corresponding to a lens of the camera is formed on the front housing, the back cover covers the opening to enclose the receiving cavity; the waterproof housing further comprises a fixing device for fixing the waterproof housing to an outer object and the fixing device is detachably mounted on the front housing;

the front housing comprises a front wall and a side wall extending towards the back cover from an edge of the front wall, the fixing device comprises a side fixing member, the side fixing member is detachably mounted on the side wall of the front housing;

a mounting hole is defined in the side fixing member, a bolt corresponding to the mounting hole is formed on the side wall, a screw hole is defined in the bolt, the fixing device comprises a screw, the screw passes through the mounting hole defined in the side fixing member and is screwed into the screw hole to fix the side fixing member to the side wall of the front housing;

the side fixing member comprises a mounting plate and a second nut, the mounting hole is defined in the mounting plate, the mounting plate is detachably mounted on the side wall of the front housing through the screw, the mounting plate comprises a first surface facing towards the side wall and a second surface facing away from the side wall, a middle portion of the first surface of the mounting plate is recessed to form a receiving slot, the second nut is arranged in the receiving slot, a through hole which corresponds to a screw hole of the second nut and communicates with the receiving slot is defined in the second surface of the mounting plate, such that a screw bolt on an outer object can be screwed into the screw hole of the second nut after passing through the through hole, thereby fixing the waterproof housing to the outer object.

2. The waterproof housing of claim 1, wherein the screw comprises a first nut, a thread section, and a connecting section connecting between the first nut and the thread section; a maximum outer diameter of the thread section is greater than a maximum outer diameter of the connecting section and is less than a maximum outer diameter of the first nut, and a minimum inner diameter of the mounting hole is less than the maximum outer diameter of the thread section and is no less than the maximum outer diameter of the connecting section.

3. The waterproof housing of claim 1, wherein a middle portion of the first surface is recessed to define an inner bottom surface and an inner edge surface, the receiving slot is formed by the inner bottom surface and the inner edge surface, the through hole passes through the inner bottom surface and the second surface, and a mounting protrusion is formed on the inner edge surface such that the second nut can tightly engage with the mounting plate.

4. The waterproof housing of claim 1, wherein a plurality of positioning protrusions or positioning recessions are arranged on the second surface of the mounting plate, and the positioning recessions or positioning recessions are arranged around the through hole, spaced from each other and forming an annular.

5. The waterproof housing of claim 1, wherein the side wall of the front housing forms a first recession corresponding to the second nut, the side wall further forms a second recession corresponding to the screw hole of the second nut at a middle portion of the first recession, and the distance between the second recession and the mounting plate is greater than the distance between the first recession and the mounting plate.

6. The waterproof housing of claim 1, wherein one side of the side fixing member facing the side wall of the front housing forms a positioning cavity corresponding to the bolt, and the bolt is received in the positioning cavity.

7. The waterproof housing of claim 1, wherein the back cover comprises an outer surface facing away from the front housing, the fixing device comprises a back fixing member, the back fixing member is arranged on the outer surface of the back cover, and the back cover is detachably mounted on the front housing; the back fixing member comprises a supporting plate and two band fastening structures respectively arranged on two opposite sides of the supporting plate, the supporting plate and the back cover are integrally formed, or the supporting plate is detachably mounted on the outer surface of the back cover.

8. The waterproof housing of claim 7, wherein four elongated mounting holes are defined in the supporting plate, screw holes corresponding to the mounting holes are defined in the outer surface of the back cover, the mounting holes are arranged around a center of the supporting plate to form an annular such that the screw can pass therethrough to be screwed into the corresponding screw hole, thereby detachably mounting the supporting plate onto the back cover.

9. The waterproof housing of claim 1, wherein the back cover comprises an outer surface facing away from the front housing, the fixing device comprises a back fixing member, the back fixing member is arranged on the outer surface of the back cover, and the back cover is detachably mounted on the front housing; the back fixing member comprises a couple of clamping plates, a pivot, and an elastic member; the pivot is arranged on middle portions of the clamping plates to rotatably connect the clamping plates; one ends of the clamping plates form a couple of clamping heads, the other ends of the clamping plates form a couple of handles; and the elastic member abuts two opposite inner surfaces of the handles to provide a clamping force to the clamping heads such that the clamping heads can clamp the outer object;
the clamping plates comprise a first clamping plate adjacent to the back cover and a second clamping plate away from the back cover, a first mounting hole is defined in an outer surface of the back cover and a second mounting hole is defined in the first clamping plate to tightly engage with a fastener to mount the first clamping plate onto the back cover; the first clamping plate comprises an outer side surface facing the back cover and an inner side surface facing the second clamping plate, an elastic arm extends from the first clamping plate towards the back cover, the elastic arm protrudes from the outer side surface of the first clamping plate and comprises a contact surface facing the back cover, a first buckling structure is arranged on the contact surface of the elastic arm, a plurality of second buckling structures engageable with the first buckling structure are arranged on the outer surface of the back cover, the second buckling structures are arranged around a center of the first mounting hole in the back cover and forms an annular, and the first buckling structure is clamped onto one of the second buckling structures.

10. The waterproof housing of claim 9, wherein a protruding stage is arranged on one side of the back cover facing towards the back fixing member, the first mounting hole and the second buckling structures are formed in the protruding stage, a first positioning structure is arranged on the outer side surface of the first clamping plate, a second positioning structure corresponding to the first positioning structure is arranged on the protruding stage, and the first positioning structure engages with the second positioning structure to mount and fix the first clamping plate and the back cover.

11. The waterproof housing of claim 1, wherein an outer surface of the front housing is recessed to define an inner bottom surface and inner edge surface corresponding to the lens window, the inner bottom surface and the inner edge surface form an accommodating slot, the front housing defines a first through hole at a middle portion of the inner bottom surface, a double-sided adhesive tape and a lens are arranged in the accommodating slot, a second through hole corresponding to the first through hole is defined in the double-sided adhesive tape, and the double-sided adhesive tape is located between the inner bottom surface of the front housing and the lens to bond the lens on the front housing.

12. A waterproof housing for a camera, wherein the waterproof housing comprises a front housing and a back cover engaging with the front housing, the front housing forms a receiving cavity for receiving the camera and an opening allowing the camera to enter the receiving cavity, a lens window corresponding to a lens of the camera is formed on the front housing, the back cover covers the opening to enclose the receiving cavity; the waterproof housing further comprises a fixing device for fixing the waterproof housing to an outer object and the fixing device is detachably mounted on the front housing;
the front housing comprises a front wall and a side wall extending towards the back cover from an edge of the front wall, the fixing device comprises a side fixing member, the side fixing member is detachably mounted on the side wall of the front housing;
a mounting hole is defined in the side fixing member, a bolt corresponding to the mounting hole is formed on the side wall, a screw hole is defined in the bolt, the fixing device comprises a screw, the screw passes through the mounting hole defined in the side fixing member and is screwed into the screw hole to fix the side fixing member to the side wall of the front housing;
the side fixing member comprises a mounting plate and a connecting portion, the mounting hole is defined in the mounting plate, the mounting plate is detachably mounted on the side wall of the front housing through the screw, the mounting plate comprises a first surface facing the side wall and a second surface facing away from the side wall, and the connecting portion is formed on the second surface of the mounting plate to be fixed to the outer object;
the connecting portion comprises a plurality of connecting plates perpendicular to the mounting plate, the connecting plates are parallel with each other and spaced from each other, and a fixing hole penetrating the connecting plates is defined in the connecting portion.

13. The waterproof housing of claim 12, wherein the screw comprises a first nut, a thread section, and a connecting section connecting between the first nut and the thread section; a maximum outer diameter of the thread section is greater than a maximum outer diameter of the connecting section and is less than a maximum outer diameter of the first nut, and a minimum inner diameter of the mounting hole is less than the maximum outer diameter of the thread section and is no less than the maximum outer diameter of the connecting section.

14. The waterproof housing of claim 12, wherein an outer surface of the front housing is recessed to define an inner bottom surface and inner edge surface corresponding to the lens window, the inner bottom surface and the inner edge surface form an accommodating slot, the front housing defines a first through hole at a middle portion of the inner bottom surface, a double-sided adhesive tape and a lens are arranged in the accommodating slot, a second through hole corresponding to the first through hole is defined in the double-sided adhesive tape, and the double-sided adhesive tape is located between the inner bottom surface of the front housing and the lens to bond the lens on the front housing.

15. The waterproof housing of claim 12, wherein the back cover comprises an outer surface facing away from the front housing, the fixing device comprises a back fixing member, the back fixing member is arranged on the outer surface of the back cover, and the back cover is detachably mounted on the front housing; the back fixing member comprises a supporting plate and two band fastening structures respectively arranged on two opposite sides of the supporting plate, the supporting plate and the back cover are integrally formed, or the supporting plate is detachably mounted on the outer surface of the back cover.

16. The waterproof housing of claim 15, wherein four elongated mounting holes are defined in the supporting plate, screw holes corresponding to the mounting holes are defined in the outer surface of the back cover, the mounting holes are arranged around a center of the supporting plate to form an annular such that the screw can pass therethrough to be screwed into the corresponding screw hole, thereby detachably mounting the supporting plate onto the back cover.

17. The waterproof housing of claim 12, wherein the back cover comprises an outer surface facing away from the front housing, the fixing device comprises a back fixing member, the back fixing member is arranged on the outer surface of the back cover, and the back cover is detachably mounted on the front housing; the back fixing member comprises a couple of clamping plates, a pivot, and an elastic member; the pivot is arranged on middle portions of the clamping plates to rotatably connect the clamping plates; one ends of the clamping plates form a couple of clamping heads, the other ends of the clamping plates form a couple of handles; and the elastic member abuts two opposite inner surfaces of the handles to provide a clamping force to the clamping heads such that the clamping heads can clamp the outer object;

the clamping plates comprise a first clamping plate adjacent to the back cover and a second clamping plate away from the back cover, a first mounting hole is defined in an outer surface of the back cover and a second mounting hole is defined in the first clamping plate to tightly engage with a fastener to mount the first clamping plate onto the back cover; the first clamping plate comprises an outer side surface facing the back cover and an inner side surface facing the second clamping plate, an elastic arm extends from the first clamping plate towards the back cover, the elastic arm protrudes from the outer side surface of the first clamping plate and comprises a contact surface facing the back cover, a first buckling structure is arranged on the contact surface of the elastic arm, a plurality of second buckling structures engageable with the first buckling structure are arranged on the outer surface of the back cover, the second buckling structures are arranged around a center of the first mounting hole in the back cover and forms an annular, and the first buckling structure is clamped onto one of the second buckling structures.

18. A waterproof housing for a camera, wherein the waterproof housing comprises a front housing and a back cover engaging with the front housing, the front housing forms a receiving cavity for receiving the camera and an opening allowing the camera to enter the receiving cavity, a lens window corresponding to a lens of the camera is formed on the front housing, the back cover covers the opening to enclose the receiving cavity; the waterproof housing further comprises a fixing device for fixing the waterproof housing to an outer object and the fixing device is detachably mounted on the front housing;

the front housing comprises a front wall and a side wall extending towards the back cover from an edge of the front wall, the fixing device comprises a side fixing member, the side fixing member is detachably mounted on the side wall of the front housing;

a mounting hole is defined in the side fixing member, a bolt corresponding to the mounting hole is formed on the side wall, a screw hole is defined in the bolt, the fixing device comprises a screw, the screw passes through the mounting hole defined in the side fixing member and is screwed into the screw hole to fix the side fixing member to the side wall of the front housing;

the side fixing member comprises a mounting plate and a connecting portion, the mounting hole is defined in the mounting plate, the mounting plate is detachably mounted on the side wall of the front housing through the screw, the mounting plate comprises a first surface facing the side wall and a second surface facing away from the side wall, and the connecting portion is formed on the second surface of the mounting plate to be fixed to the outer object;

one end of the connecting portion away from the mounting plate forms a ball head.

19. The waterproof housing of claim 18, wherein the screw comprises a first nut, a thread section, and a connecting section connecting between the first nut and the thread section; a maximum outer diameter of the thread section is greater than a maximum outer diameter of the connecting section and is less than a maximum outer diameter of the first nut, and a minimum inner diameter of the mounting hole is less than the maximum outer diameter of the thread section and is no less than the maximum outer diameter of the connecting section.

20. The waterproof housing of claim 18, wherein an outer surface of the front housing is recessed to define an inner bottom surface and inner edge surface corresponding to the lens window, the inner bottom surface and the inner edge surface form an accommodating slot, the front housing defines a first through hole at a middle portion of the inner bottom surface, a double-sided adhesive tape and a lens are arranged in the accommodating slot, a second through hole corresponding to the first through hole is defined in the double-sided adhesive tape, and the double-sided adhesive tape is located between the inner bottom surface of the front housing and the lens to bond the lens on the front housing.

* * * * *